United States Patent [19]

Okumura et al.

[11] Patent Number: 5,283,026
[45] Date of Patent: Feb. 1, 1994

[54] METHOD FOR MOLDING FIBER-REINFORCED COMPOSITE MATERIAL

[75] Inventors: Toshiaki Okumura, Nishinomiya; Takao Ekimoto, Kobe; Kourou Takatsuka, Ashiya; Ryosaku Kadowaki; Ryuichiro Kato, both of Kobe; Masahiro Tomita, Kobe; Katsumi Ogawa, Amagasaki; Kimio Inoue; Fumiaki Komatsu, both of Kobe; Atsushi Takusagawa, Kobe, all of Japan

[73] Assignee: Kabushiki Kaisha Kobe Seiko Sho, Kobe, Japan

[21] Appl. No.: 741,515

[22] PCT Filed: Dec. 12, 1990

[86] PCT No.: PCT/JP90/01628

§ 371 Date: Aug. 8, 1991

§ 102(e) Date: Aug. 8, 1991

[87] PCT Pub. No.: WO91/08883

PCT Pub. Date: Jun. 27, 1991

[30] Foreign Application Priority Data

Dec. 12, 1989 [JP] Japan .................. 1-322836
Dec. 12, 1989 [JP] Japan .................. 1-322837
Dec. 12, 1989 [JP] Japan .................. 1-322838
Dec. 12, 1989 [JP] Japan .................. 1-322839

[51] Int. Cl.⁵ ............................................. B29B 13/02
[52] U.S. Cl. ......................... 264/234; 264/236; 264/257; 264/322; 264/347; 264/DIG. 65
[58] Field of Search ............... 264/122, 517, 257, 258, 264/22, 29.6, 25, 34.9, 154, 156, 155, 517, 347, 236, 349, 510, 519, 322, 234; 156/92

[56] References Cited

U.S. PATENT DOCUMENTS

| 598,282 | 2/1898 | Carmichael | 264/349 |
|---|---|---|---|
| 2,244,550 | 6/1941 | Chandler | 264/156 |
| 2,289,177 | 7/1942 | Chandler | 264/156 |
| 2,526,876 | 10/1950 | Sejersted | 264/29.6 |
| 2,533,609 | 12/1950 | Nolan et al. | 264/156 |
| 2,707,804 | 5/1955 | Thornburg | 264/319 |
| 2,900,109 | 8/1959 | Hoopes et al. | 222/1 |
| 3,005,491 | 10/1961 | Wells | 264/156 |
| 3,301,935 | 1/1967 | Stoeckhert | 264/345 |
| 3,391,846 | 7/1968 | White | 264/25 |
| 3,405,204 | 10/1968 | McCormack | 264/347 |
| 3,477,961 | 11/1969 | Castagna | 264/25 |
| 3,650,866 | 3/1972 | Prentice | 264/345 |
| 3,704,194 | 11/1972 | Harrier | 264/156 |
| 3,719,736 | 3/1973 | Woodruff | 264/156 |

(List continued on next page.)

FOREIGN PATENT DOCUMENTS

| 703789 | 2/1965 | Canada | 264/156 |
|---|---|---|---|
| 47-14278 | 8/1972 | Japan | 264/156 |
| 47-142278 | 8/1972 | Japan | 264/156 |
| 59-118418 | 7/1984 | Japan . | |
| 59-220932 | 12/1984 | Japan . | |
| 62-242507 | 10/1987 | Japan | 264/37 |
| 1224786 | 3/1971 | United Kingdom | 264/156 |

Primary Examiner—Jay H. Woo
Assistant Examiner—Duane S. Smith
Attorney, Agent, or Firm—Oblon, Spivak, McClelland, Maier & Neustadt

[57] ABSTRACT

The present invention relates to a method for molding an agglomerated preform of a fiber-reinforced composite material comprising a resin material as a matrix and reinforcing fibers dispersed therein, into a desired shape. In the molding method, the preform is heated from the interior thereof, whereby the temperature of the entire preform can be raised efficiently and uniformly. If an optional number of holes are formed in the agglomerated preform, rod-like heaters for heating or gas nozzles for the release of heated gas can be inserted into the preform easily through such holes, whereby uniform heating can be effected. Further, by incorporating an appropriate amount of a dielectric loss improver into the preform and thereafter subjecting the preform to high-frequency heating or microwave heating, the preform can be heated efficiently and uniformly in a short time.

6 Claims, 9 Drawing Sheets

U.S. PATENT DOCUMENTS

| | | | |
|---|---|---|---|
| 3,763,293 | 10/1973 | Nussbaum | 264/25 |
| 3,787,546 | 1/1974 | Pratt et al. | 264/156 |
| 3,849,527 | 11/1974 | Drostholm | 264/347 |
| 3,850,723 | 11/1974 | Ackley | 264/136 |
| 3,919,369 | 11/1975 | Holden | 264/156 |
| 3,952,402 | 4/1976 | Meneringhausen | 264/156 |
| 4,132,519 | 1/1979 | Reed | 264/156 |
| 4,218,276 | 8/1980 | King | 156/92 |
| 4,251,477 | 2/1981 | Christian | 264/232 |
| 4,257,835 | 3/1981 | Bompard | 156/92 |
| 4,367,109 | 1/1983 | Estrade et al. | 264/519 |
| 4,486,372 | 12/1984 | Millard et al. | 264/156 |
| 4,545,837 | 10/1985 | Wehnert et al. | 264/155 |
| 4,652,415 | 3/1987 | Nguyen et al. | 264/236 |
| 4,696,711 | 9/1987 | Greszczuk | 264/155 |
| 4,767,799 | 8/1988 | Thorsrud | 264/25 |
| 4,950,532 | 8/1990 | Das et al. | 264/DIG. 65 |
| 4,980,384 | 12/1990 | Takahashi et al. | 264/25 |
| 5,028,374 | 7/1991 | Imao et al. | 264/517 |
| 5,047,198 | 9/1991 | Kim | 264/DIG. 65 |
| 5,066,442 | 11/1991 | Gutowski et al. | 264/154 |

METHOD FOR MOLDING FIBER-REINFORCED COMPOSITE MATERIAL

FIELD OF ART

The present invention relates to a preform of a fiber-reinforced composite material comprising a synthetic resin material and reinforcing fibers dispersed therein, and also to a method for molding such preform into a desired shape.

BACKGROUND ART

Composite materials comprising thermosetting or thermoplastic synthetic resins and reinforcing fibers dispersed uniformly therein are superior in physical properties (particularly tensile strength and impact resistance, so are widely used as panel materials, outer plies, container materials, etc.).

In forming any of such composite materials into a desired shape, it is formed beforehand into a sheet-like or agglomerated shape (including a bulky or block-like shape) (hereinafter referred to as "preform"), and the preform is heated before molding. This is a commonly-adopted molding method.

Sheet-like preforms are widely used because they are advantageous in that they can be easily heated uniformly and are superior in press-moldability. However, sheet-like preforms involve the following drawbacks.

① There has been adopted a method wherein a synthetic resin material is melt-extruded into sheet and impregnation is made while a glass fiber mat or chopped strands are sandwiched in between two such sheets. According to this method, however, there may occur breakage of the reinforcing fibers during the operation, and the manufacturing cost is high.

② In forming (hereinafter referred to sometimes as "secondary forming") a sheet-like preform into a desired commodity shape, it is necessary to cut the sheet-like preform according to the desired shape, then laminating such cut preforms onto a metal mold according to a desired thickness and press-molding the laminate, so the molding cost is high.

Recently, therefore, the demand for agglomerated preforms have been increasing gradually.

However, it takes considerable time to heat up agglomerated preforms uniformly without a temperature gradient from the exterior surface to the center of the preform, because agglomerated preforms are thick-walled. More particularly, for heating such agglomerated preforms there usually is employed an infrared heater, an electric heater, or hot air, but all of these methods apply heat from the outside of preforms, so a temperature gradient is formed from the outer surface side toward the center in the preforms, and if the heating speed is too high, the outer peripheral portion will assume an overheated state when the temperature of the central portion has reached an appropriate processing temperature.

Consequently, for example in the case of an agglomerated preform using a thermoplastic resin, the outer periphery side may be softened to an excessive degree and fluidized, or in the case of an agglomerated preform using a thermosetting resin, secondary hardening on the outer periphery side will proceed. In both cases, the moldability is deteriorated markedly.

In order to avoid such problems it is required to make the heating rate as low as possible and thereby minimize the foregoing temperature gradient, so a long time is required for raising the temperature up to the molding temperature. As a result, not only the productivity of molded products is deteriorated markedly but also in the case of an agglomerate preform using a thermosetting resin, secondary hardening proceeds and processability deteriorated during such long time.

The present invention has been accomplished in view of such problems, and it is the object thereof to provide a molding method wherein in a heating process performed prior to molding there is included a heating step capable of raising the temperature of an agglomerated preform uniformly and efficiently, and also provide a preform of a fiber-reinforced composite material.

DISCLOSURE OF THE INVENTION

According to the present invention, an agglomerated preform of a fiber-reinforced composite material is heated from the interior to raise the temperature of the entire agglomerated preform up to a uniform molding temperature in a short time, thereby reducing or eliminating the difference in temperature between the central side and the exterior side.

Specific means will now be described. According to one specific method, an optional number of gas nozzles are inserted into a preform and heated gas is blown into the preform through the gas nozzles, whereby the heated gas is dispersed uniformly in the preform to raise the temperature of the whole preform uniformly from the interior.

According to another method, an optional number of rod-like heaters are inserted into a preform and the temperature of whole preform is raised uniformly from the interior thereof by heating using the rod-like heaters.

According to a further method, a predetermined amount of a dielectric loss improver is uniformly incorporated beforehand into a preform and the temperature of the entire preform is raised uniformly by utilizing the phenomenon of intermolecular friction which is induced by microwave heating or high-frequency heating through electrode plates.

There also may be adopted a method wherein there is formed a preform of a fiber-reinforced composite material so as to have an optional number of holes and permit the foregoing rod-like heaters or gas nozzles to be inserted into the holes easily, whereby the temperature of the entire preform can be raised more uniformly and efficiently without causing movement or consolidation of material in the preform at the time of inserting the heaters or the like into the holes.

Further, if a predetermined amount of one or more dielectric loss improvers, typical of which are silicon carbide, carbon black, rubbery materials, marble, soda glass, water, ethylene glycol, and glycerin, are uniformly incorporated beforehand into a preform of a fiber-reinforced composite material, the heating efficiency in the foregoing microwave heating or high-frequency heating is improved, whereby the temperature the entire preform can be raised uniformly and efficiently.

BEST FORM FOR PRACTISING THE INVENTION

Figure 1:
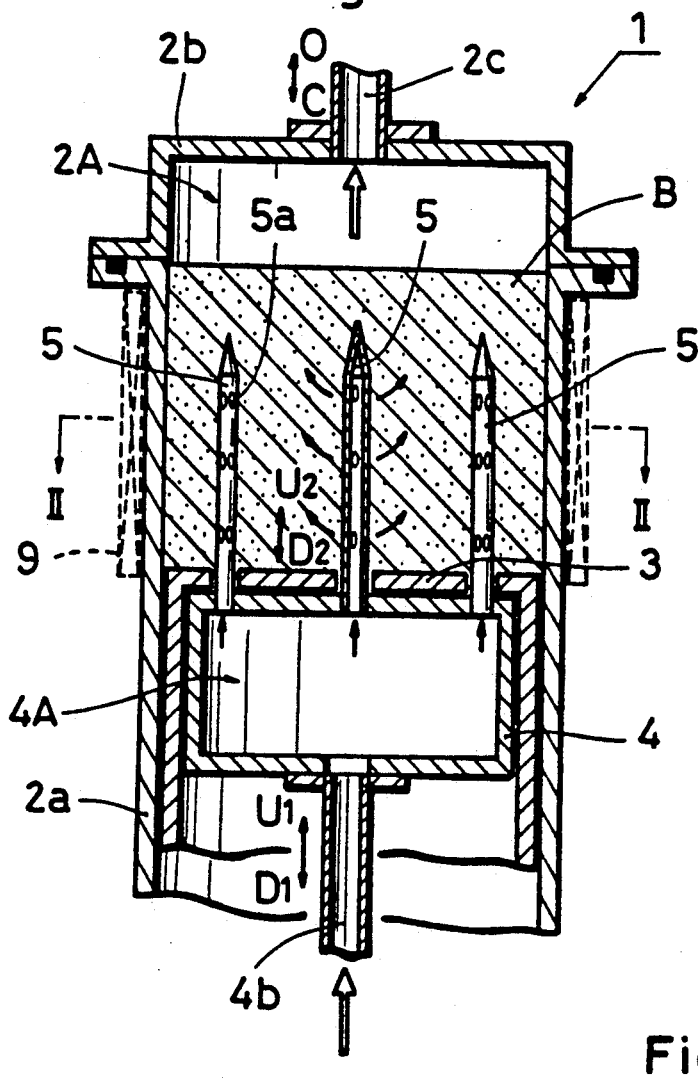
FIG. 1 is an explanatory sectional view showing an example of a heating apparatus using gas nozzles in practising the method of the present invention.

Referring to FIG. 1, which is an explanatory sectional view showing example of a heating apparatus used in the present invention, the heating apparatus, indicated at 1, is provided with a cylindrical casing 2a and a lid 2b mounted for opening and closing (arrow O-C directions) to an opening (an upper opening in the figure) formed on one side of the casing 2a. A gas discharge pipe 2c is disposed in the lid 2b. On the other hand, an inner cylinder 3 capable of moving axially (in arrow $U_2$—$D_2$ directions) is received in the casing 2a, and a gas supply mechanism 4 which is movable axially (in arrow $U_1$—$D_1$ directions) is provided within the inner cylinder 3. A gas storage chamber 4A is formed in the interior of the gas supply mechanism 4, and a plurality of hollow tube-like gas nozzles 5 having such tips are projecting upwards through the inner cylinder 3, with a large number of gas ejection holes 5a being formed in the peripheral wall of each gas nozzle 5. A gas supply pipe 4b for the supply of heated inert gas is connected to the gas storage chamber 4A. An optional number (including unity) of gas nozzles 5 is provided in accordance with the size of an agglomerated preform B and for insertion into the preform. In the case where plural gas nozzles are used, it is desirable to arrange them at equal intervals. Provided, however, that they may be arranged at optional intervals while simulating the flow of gas in the preform B. Although the gas nozzles illustrated in the figure are straight tube-like, spiral tube-like nozzles may be inserted under rotation into the preform.

An example of a method for heating the agglomerated preform B, which is formed of a fiber-reinforced composite material, using the heating apparatus 1, will be described below in detail.

First, the lid 2b is retracted to its open position, namely, upwards and the gas supply mechanism 4 is moved backward in the arrow $D_1$ direction so that the tips of the gas nozzles 5 are completely retracted into the inner cylinder 3. Then, the agglomerated preform B is placed into the casing 2a and the lid 2b is closed. Subsequently, heated inert gas is fed into the gas storage chamber 4A through the gas supply pipe 4b and is distributed to the gas nozzles 5, and the gas nozzles 5 are inserted into the preform B while the heated gas is allowed to jet from the gas ejection holes 5a. At this time, if the gas is ejected after insertion of the gas nozzles 5, it is likely that the gas ejection holes 5a will be clogged with synthetic resin powder or the like. But, when there is used a preform B not having such likelihood, the ejection of heated gas may be started after insertion of the gas nozzles 5 into the preform B. If holes corresponding to the gas nozzle insertion passages are formed beforehand in the preform (see FIG. 8), that is, if an inner mold corresponding to the gas nozzles 5 is used in forming the preform, not only the insertion of the gas nozzles 5 becomes easier but also there does not arise the problem of partial consolidation of the preform or non-uniform flow of gas which are caused by forced insertion of the gas nozzles.

In the above state, the heated gas is fed continuously or intermittently from the gas supply pipe 4b and is released upward while being dispersed to the interior of the preform B, whereby the preform B is heated uniformly and quickly from the interior thereof. As the heated gas, it is recommended to use an inert gas such as nitrogen gas or argon gas, but when the synthetic resin material used is difficult to undergo an oxidative deterioration, there may be used heated air for example.

The gas which has passed through the preform B is collected in a chamber 2A formed in the interior of the lid 2b and is discharged from the discharge pipe 2c. The size of the chamber 2A can be set freely.

When the whole of the preform B has been heated to a predetermined temperature in the above manner, the lid 2b is opened, the inner cylinder 3 is moved up in the direction of arrow $U_2$, the preform B is discharged from the upper portion of the casing 2a and is conveyed to a molding apparatus such as a pressing apparatus for example.

Figure 2:
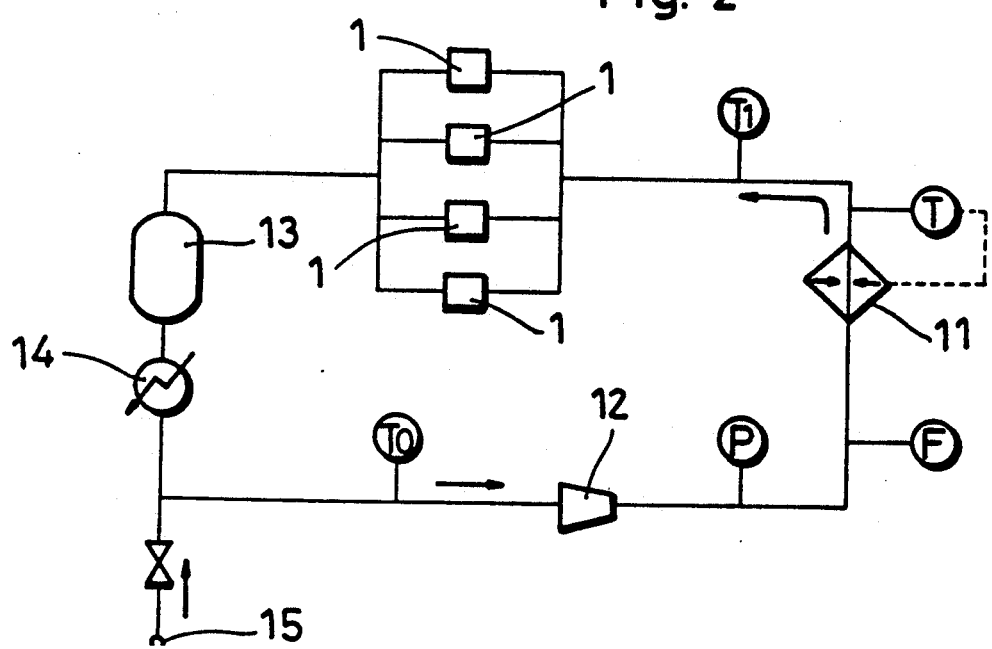
FIG. 2 is a flow chart showing an example of feeding a heating gas used in the heating apparatus of FIG. 1.

Referring now to FIG. 2, which is a flowchart showing an example of supplying heated gas to a plurality of heating apparatus 1, the gas fed from a gas supply source 15 is pressurized by means of a blower 12 and then fed to a heater 11, in which the gas is heated up to a predetermined temperature (e.g. 220°–240° C.), then fed to the gas supply pipe of each heating apparatus 1. The used gas collected by the gas discharge pipe of the heating apparatus 1 is once stored in a tank 13, then cooled by a cooler 14 to a temperature at which the blower 12 can suck the gas, and thereafter recirculated. When there is used a blower capable of sucking gas at a temperature of 150° C. or so, it is not necessary to use the cooler 14.

Although in the apparatus illustrated in FIG. 1 the preform B is heated with only heated gas, if the preform is heated auxiliary also from the outer peripheral side, for example by providing a jacket-like heater 9 in the outer peripheral portion of the casing 2a, as indicated with broken lines, or by providing a face-form heater on the upper surface of the inner cylinder 3, the time required for heating can be further shortened.

A total opening area Sr of the gas ejection holes 5a of the gas nozzles 5 can be selected optionally in accordance with the shape and size of the preform used. Preferably, in order to realize an appropriate heating, when the area of the surface on the gas nozzle insertion side of the preform B (this is also applicable to the opposite-side face in principle) is Sn, the above total opening area Sr is not smaller than $(1/50) \times Sn$.

Figure 4:
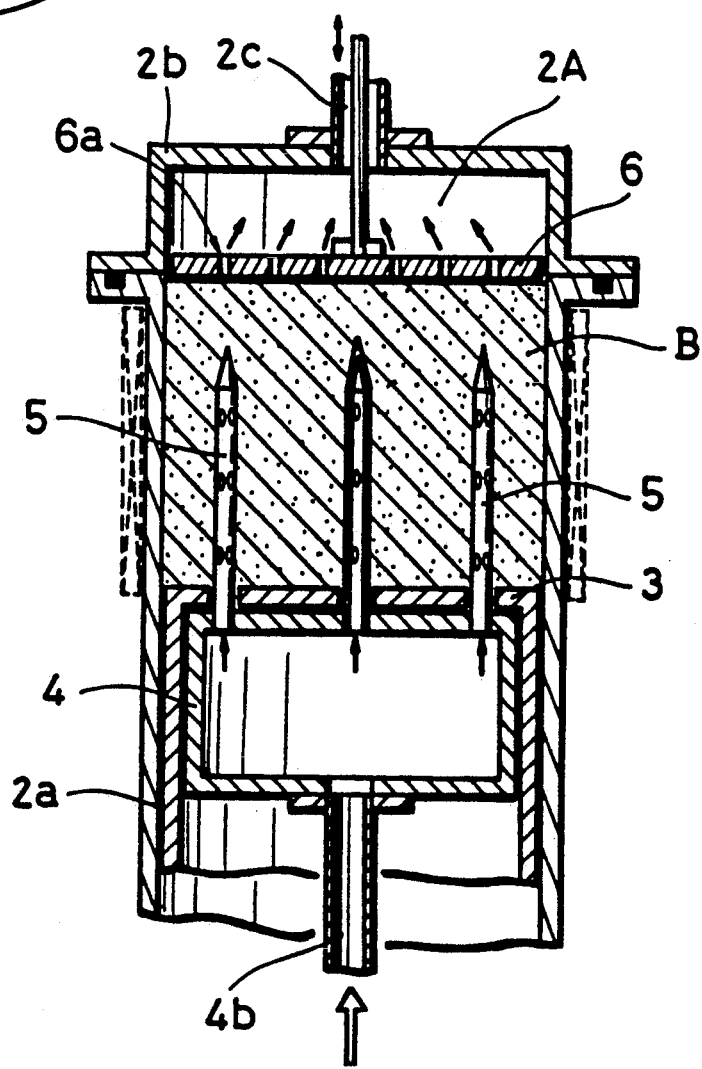
FIGS. 4 and 5 are explanatory sectional views showing other examples heating apparatus using gas nozzles in practising the method of the present invention.

Referring now to FIG. 4, there is illustrated a heating apparatus having a structure of preventing the expansion of the preform B, in which pressing plate 6 capable of approaching and leaving the preform B is mounted to the lid 2b so that it can press the upper surface of the preform B received in the casing 2a. A large number of through holes are formed in the pressing plate 6, and heated gas passes through the through holes 6a and is collected into a gas discharge pipe 2c.

Figure 5:
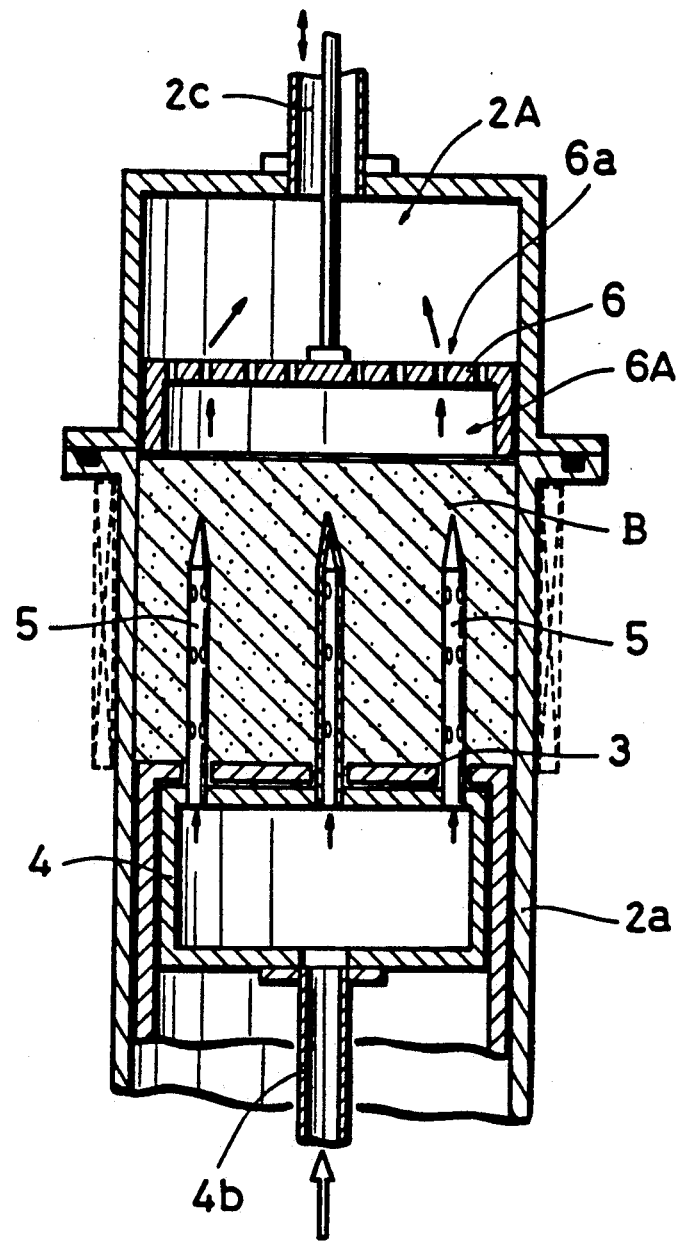

When the preform B is pressed completely from the upper surface thereof as in the example of FIG. 4, it is likely that the flow of heated gas will be obstructed. Therefore, as shown in FIG. 5, it is recommended to provide a gas sump 6A formed by a slight gap under the pressing plate 6, thereby ensuring the flow of gas while permitting the expansion of the preform B to some extent.

Figure 3:
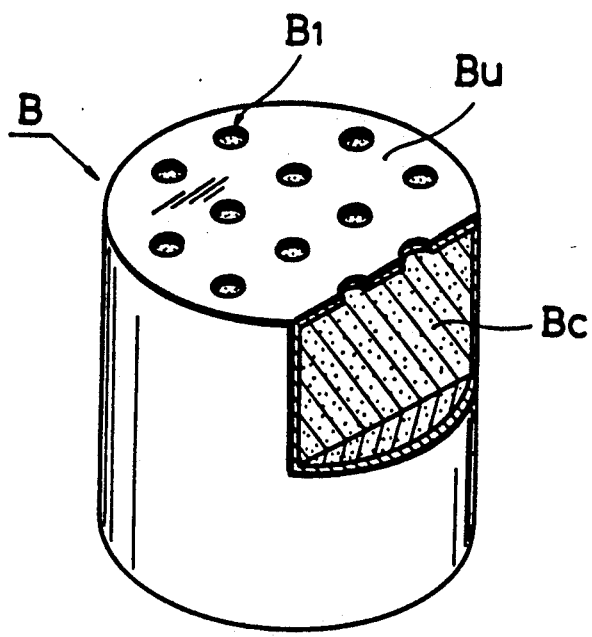
FIG. 3 is a partially broken away, explanatory view of an agglomerated preform used in the heating apparatus of FIG. 1.

For the purpose of improving handleability, some preform B comprises a solid film Bu about 1-3 mm thick formed on the outer surface of the preform and a mixture Bc of a synthetic resin powder and a reinforcing fiber wrapped in the solid film, as shown in FIG. 3. If such a preform B is applied as it is to the heating apparatus 1 shown in FIG. 1, the interior space defined by the solid film Bu of the preform B will be filled with heated gas, resulting in that a weak part of the solid film will burst, thus causing localization of the components of the mixture Bu, or causing a deflected flow of heated gas, leading to loss of uniformity in heating. With a view of preventing such inconvenience, there may be used the pressing plate 6 having holes 6a as in FIG. 4, but if a large number of vent holes $B_1$ are formed through the solid film Bu in the outer surface as an open surface of the preform B, there is no fear of bursting of the solid film Bu because the heated gas ejected to the interior of the preform B passes through the vent holes $B_1$. Further, although in the example of FIG. 1 the length of each gas nozzle 5 is smaller than the thickness in the height direction of the preform B, it may be rendered longer than the said preform thickness to the extent of its tip projecting from the preform B and breaking through the solid film Bu, thereby improving the passability of heated gas.

It is preferable that a total opening area Sm of the vent holes $B_1$ be one half or more of the total opening area Sr of the gas ejection holes 5a formed in the gas nozzles 5. As a result, heated gas passes out smoothly from the preform B, so the heating efficiency is improved, and there is no fear of the heated gas pressure becoming too high in the preform B and obstructing the flow of heated gas, nor is there the possibility of the required time for heating becoming longer. Besides, it is no longer possible at all that there will occur a deflecting flow in the heated gas flow which would make the heating distribution nonuniform.

Figure 6:
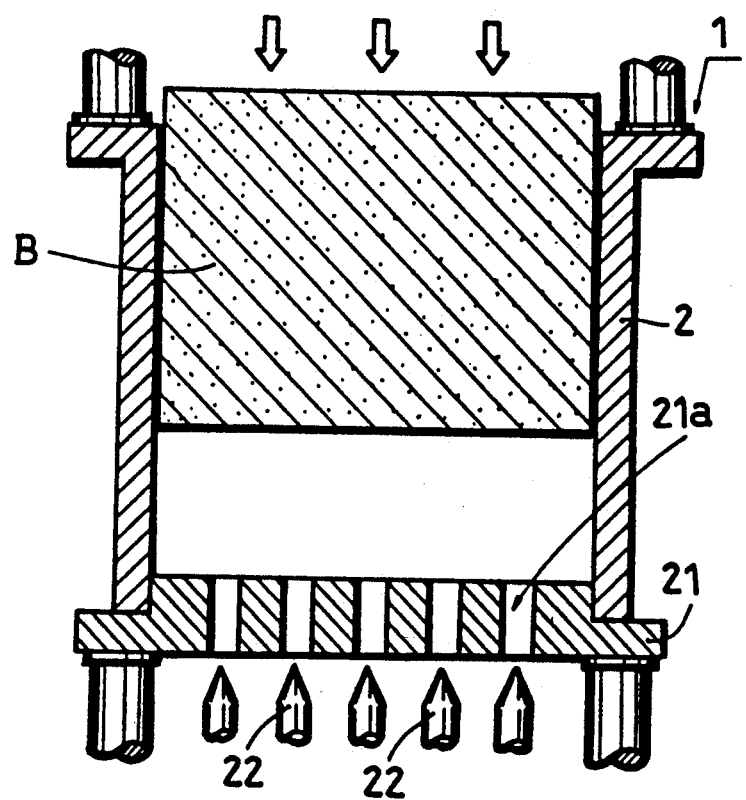
FIGS. 6 and 7 are explanatory sectional views showing a heating process in a heating apparatus using rod-like heaters.
Figure 7:
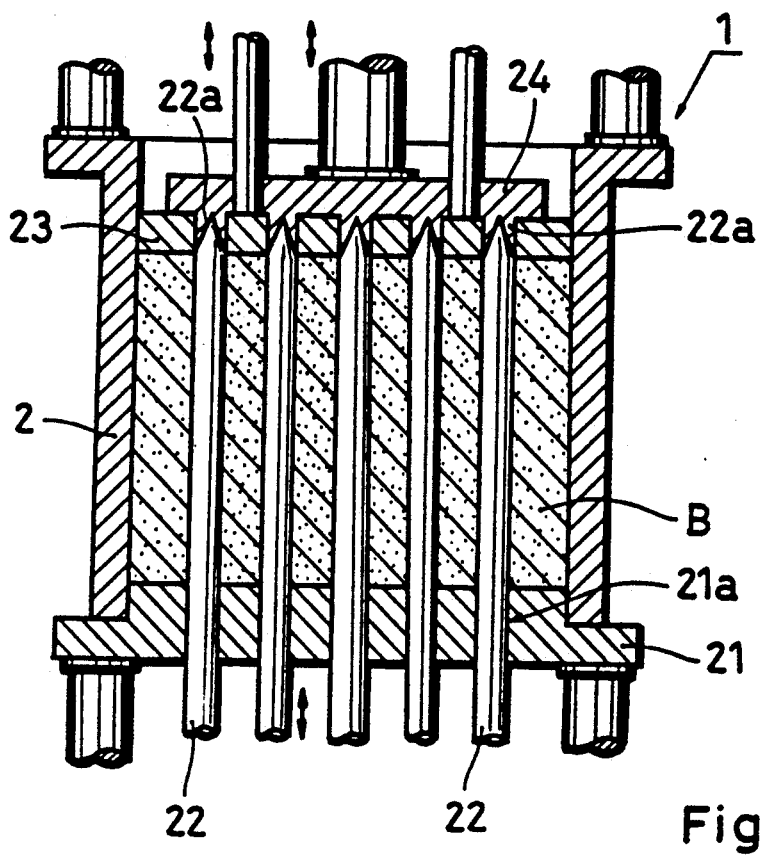

Referring now to FIGS. 6 and 7, which are explanatory sectional views showing a heating apparatus 1 using rod-like heaters, a vertically movable bottom plate 21 having through holes 21a is provided under a casing 2, and a plurality of rod-like heaters 22 capable of being inserted into and removed from the through holes 21a are disposed under the bottom plate 21. A lid member 23 capable of approaching and leaving a preform B received in the casing 2 is provided in the upper portion of the casing, and through holes for insertion therethrough of tips 22a of the rod-like heater 22 are formed in the lid member 23. Further, on the lid member 23 is disposed vertically movable upper lid 24 which are fitted on the tips of the rod-like heaters 22 and closes the said through holes. The number, thickness and length of the rod-like heaters 22 are selected suitably in accordance with the composite material to be heated.

An example of the method for heating an agglomerated preform using such heating apparatus 1 will be described below.

First, as shown in FIG. 6, the bottom plate 21 is disposed under the casing 2, a cylindrical preform B is loaded from the upper opening of the casing 2, and the lid member 23 and upper lid 24 are brought down from above until abutment with the upper surface of the preform B. Then, the rod-like heaters 22 are moved upward and inserted into the preform B, as shown in FIG. 7.

Figure 8:
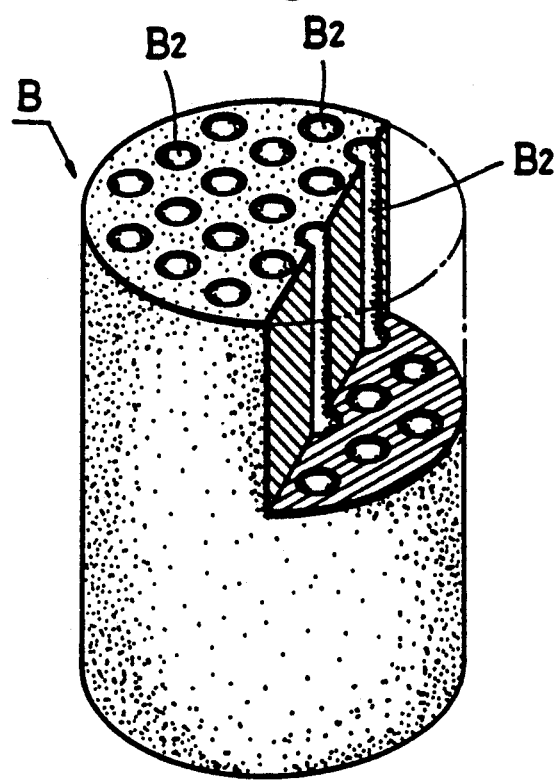
FIG. 8 is a partially broken away, explanatory view of an agglomerated preform used in the apparatus of FIG. 7.

Although there is no problem in the case where the preform B is small in the degree of consolidation and still has a margin of compression, when there is used a preform of high density which has been formed at a high pressure, the lid member 23 may be disposed in a somewhat higher position to release the expansion of the preform caused by the rod-like heaters 22, or holes $B_2$ corresponding to the rod-like heaters 22 may be formed beforehand in the preform B, as shown in FIG. 8. Such a preform B can also be used for the insertion therein of the gas nozzles 5, as described previously.

When the rod-like heaters 22 are heated, the preform B is heated from the inner side and there is performed a uniform heating with small temperature gradient in the interior of the preform B. Further, if a sheet-like heater or the like is attached to each of the casing 2, lid member 23 and bottom plate 21, the preform B can be heated uniformly from both the inside and the outside.

After completion of the heating, the rod-like heaters 22 are retracted and the preform B is moved to the upper portion of the casing 2 while be sandwiched in between the bottom plate 21 and the lid member 23, then the lid member 23 is retracted. Thereafter, the preform B is fed to a mold machine as in FIG. 9.

Figure 9:
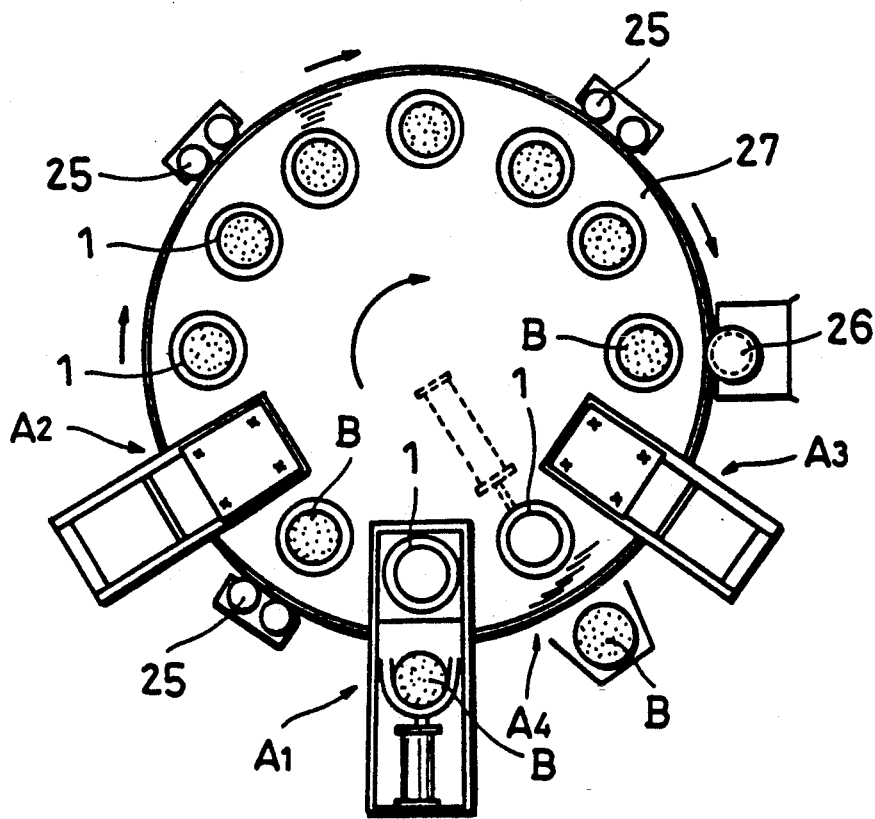
FIG. 9 is a plan view showing the whole of a continuous heating system using the heating apparatus illustrated in FIG. 1 or FIG. 7.

FIG. 9 is a plan view showing a turntable type continuous heating system for heating preforms B continuously by heating apparatus 1 using gas nozzles 5 or rod-like heaters 22. A turntable 27 is provided with a plurality of heating apparatus 1 and is rotated by a driving roller 26. Along the outer peripheral edge of the turntable 27 there are disposed the driving roller 26 and guide rollers 25, as well as preform feeding machine $A_1$ and discharging machine $A_4$. A preform B is fed to a heating apparatus on the turntable 27 by the feeding machine $A_1$, then in the position $A_2$ the heaters or nozzles are inserted into the preform B, whereby the preform is heated until reaching the position $A_3$. The thus-heated preform B is taken out from the heating apparatus 1 by means of the discharging machine $A_4$ is fed thereby to the molding machine.

No limitation is placed on the kind of synthetic resin or that of reinforcing fiber as materials of the composite to be used in the above heating method. As the synthetic resin there may be selected a suitable one from among thermosetting resins and thermoplastic resins according to the use and characteristics required. Also, examples of employable reinforcing fibers include various metallic fibers and whiskers in addition to most commonly used glass fibers and carbon fibers. If necessary, moreover, in the composite material containing such synthetic resin and reinforcing fiber there may be incorporated filler, antioxidant, stabilizer, coloring agent, plasticizer, antistatic agent, flame-retardant, etc.

The method for forming the composite material into a preform is not limited at all, either. A conventional preforming method may be used as it is or after some modification. The following are typical examples of preforming methods.

① A synthetic resin powder and short reinforcing fibers are mixed in vapor phase (dry-mixed) together with other additives if necessary and the resulting mixture is charged into a mold, followed by dust molding. In this case, the use of a suitable binder is effective in enhancing moldability and shape retaining property. It is also possible to heat the mixture to a certain extent in the dust molding process, allowing the synthetic resin powder to be melted partially for fusion-bonding and thereby enhancing the shape retaining property.

② A synthetic resin powder and short reinforcing fibers are wet-mixed together with other additives if necessary, using water as a mixing medium, then the resulting mixture is formed into a desired shape and dried. Alternatively, the mixture is extruded into a rod-like shape using a plunger extruder, then cut into a suitable length and thereafter dried. Also in this case, a suitable binder may be added, if necessary, for enhancing the moldability and shape retaining property.

③ Such a dry mixture, as shown in ①, is charged into a plunger extruder, then heated moderately in a discharge die portion to melt the synthetic resin powder partially, and in this state the mixture is extruded.

EXAMPLE NO. 1

Using the heating apparatus 1 shown in FIG. 7, a composite material a uniform mixture consisting of 60 wt % polypropylene powder and 40 wt % short glass fibers was preformed into a short column shape (200 mm dia. 200 mm long), and a heating experiment was conducted. In this experiment, as rod-like heaters there were used forty electric heating type rod-like heaters each 16 mm in diameter, and for heating the casing there was used a band heater from the outer surface side, while for heating the lid member and the bottom plate there were used plate heaters. In both cases, the surface temperature was controlled to 260° C. For preventing oxidative deterioration of the composite material, nitrogen gas was passed through the heating apparatus 1.

As a result, the temperature of the composite material rose to 220° C. in about 2 minutes. The temperature difference in the preform was within ±2.5° C. and thus very small. An extremely uniform heating was confirmed.

By way of comparison, heating was made from only the outer surface side of the casing, bottom plate and lid member in the same manner as above except that the heating using the rod-like heaters was omitted. As a result, about 30 minutes was required for the composite material temperature to rise to 220° C. at the central portion thereof. The temperature of the surface side rose to 260° C. and the synthetic resin melted, resulting in that it became difficult to remove the composite material from the heating apparatus. The temperature difference of about 40° C. between the surface side and the central portion exerted a bad influence on the compression molding in the molding apparatus.

In the present invention, an agglomerated preform can also be subjected to high-frequency heating (usually 3 to 300 MHz) or microwave heating (usually 300 MHz to 30 GHz) and thereby can be heated uniformly and efficiently.

Generally, microwave heating or high-frequency heating depends much on a dielectric loss of the material to be heated. Also in the present invention it turned out that the effect of the heating was dependent on electrical characteristics of the composite material used and reinforcing fibers incorporated therein as well as other additives if necessary.

In the present invention, from the standpoint of exhibiting a continually stable heating effect regardless of what starting materials are used, studies have been made about various additives with a view to enhancing the dielectric loss factor of the foregoing agglomerated preform, and as a result, a conclusion of incorporating a dielectric loss improve in the preform was reached. The dielectric loss improver indicates a substance whose dielectric loss angle or dielectric constant is high and which thereby exhibits a high dielectric loss factor. Typical examples are silicon carbide, carbon black, various rubbery materials, marble, soda glass, water, ethylene glycol, and glycerin.

It is necessary that the amount of the dielectric loss improver used be not smaller than 0.1 wt % based on the total weight of the agglomerate preform in both microwave heating and high-frequency heating, whereby it is made possible to enhance the dielectric loss factor of the preform to the extent that the effect of the heating is exhibited satisfactorily.

In the case of high-frequency heating, however, if the dielectric loss improver is used in an amount exceeding 40 wt % based on the total weight the preform, the strength of the agglomerated preform and that of the resulting molded article will be too much deteriorated. A preferred range is 0.1 to 4.5 wt %.

In the case of microwave heating, it turned out that 0.1 to 4.5 wt % of the dielectric loss improver based on the total weight of the preform sufficed. This is because the heating efficiency in microwave heating superior to that in high-frequency heating.

Figure 10:
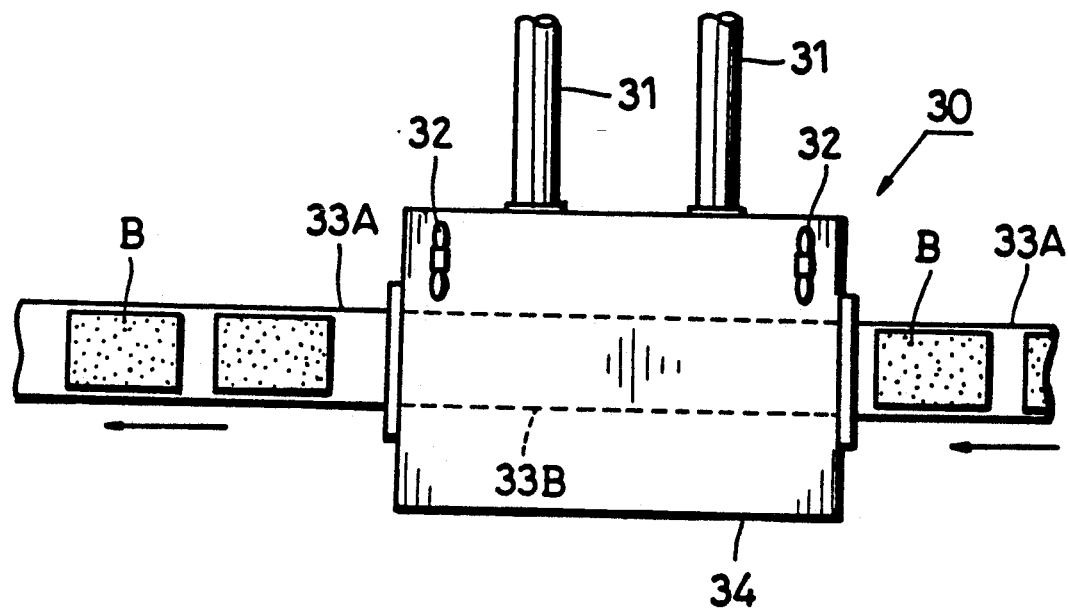
FIG. 10 is an explanatory side view showing an example of a heating apparatus using microwave radiation in practising the method of the present invention.

FIG. 10 is an explanatory side view showing an example of a microwave heating apparatus 30. In the same figure, iron pipes 33A, 33A are connected to a heating furnace 34 which incorporates therein a quartz pipe passage 33B and a fan 32, and waveguides 31, 31 are disposed on the heating oven 34. Each preform B moves in the direction of arrow through the iron pipe 33A and enters a heating oven 3, in which it is heated by microwaves introduced from the waveguides 31, 31. The microwaves are reflected irregularly by the fan 32 and radiated from various angles to the preform B in the heating oven 34. If the preform B itself moves, for example rotates, vibrates, or ascends and descends, the surface of the preform which undergoes the microwave radiation varies, whereby a more uniform heating is attained. In this case, since the quartz pipe passage 33B does not absorb microwaves, the microwaves are radiated directly to the agglomerated preform B. It is recommended that the interior of the heating oven 34 be purged with an inert gas such as nitrogen gas for example to prevent oxidative deterioration of plastic material and other components.

EXAMPLE NO. 2

Carbon black as a dielectric loss improver was incorporated in a composite material comprising polypropylene powder and glass fibers in such a manner that the proportion of the dielectric loss improver was 0.5 wt %. Using the resulting mixture, a columnar preform of 200 mm dia. by 200 mm long (weight: 3 kg) was produced and it was then subjected to the radiation of microwaves. At this time, the temperature of the preform rose to 220° C. in only 3 minutes, and the temperature difference distribution in the interior of the preform was ±5° C., thus exhibiting excellent uniformity. The mechanical strength of the final product was higher than that of a molded article obtained by using a comparative product which had been subjected to kneading and heating.

Figure 11:
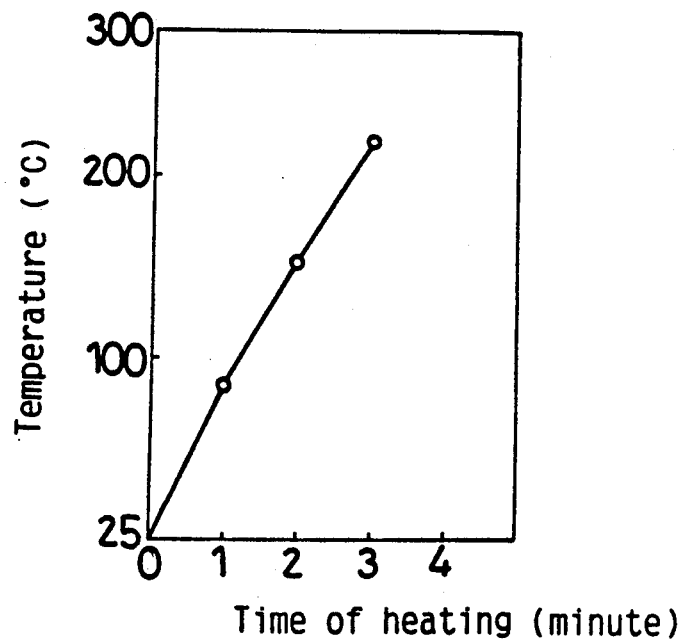
FIG. 11 is a graph showing a relation between heating time and reached temperatures in microwave heating.

In this microwave heating there was determined a relation between the heating time (unit: minute) and the temperature of the central portion of the agglomerated preform. The results obtained are as shown in FIG. 11. As can be seen from this graph, there exists a proportional relationship between the heating time and the central portion temperature, and the heating method of the present invention is very stable and superior in controllability.

Figure 12:
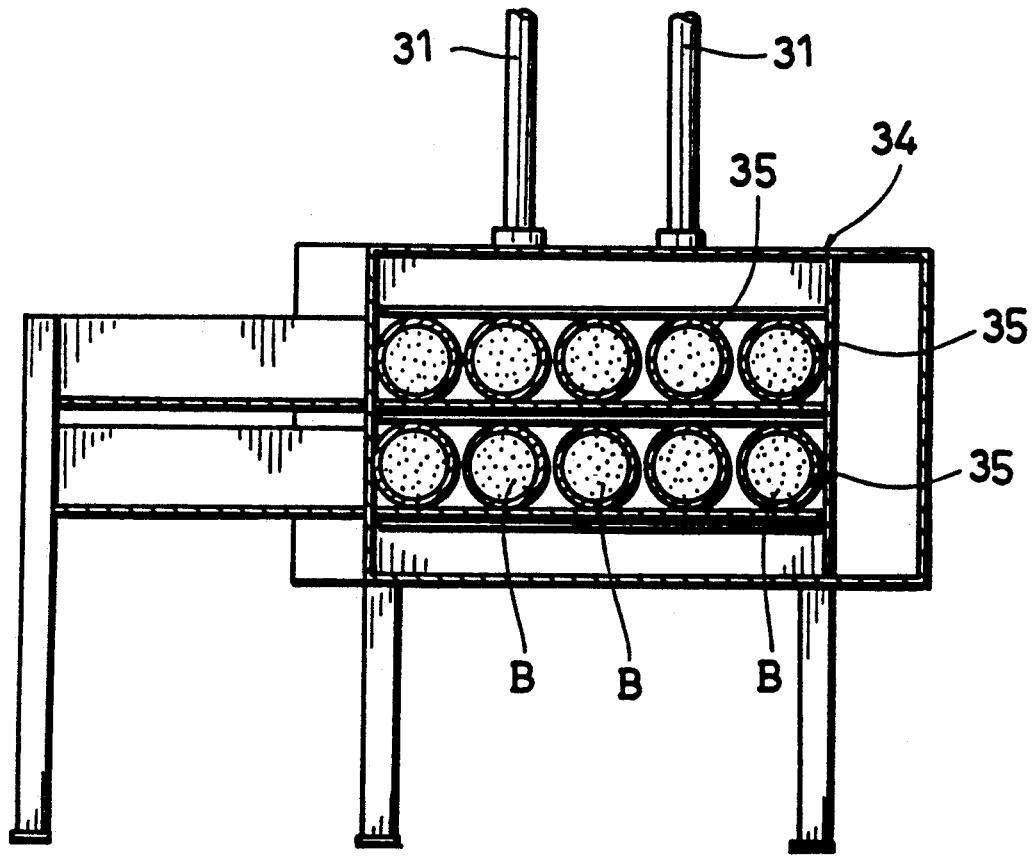
FIG. 12 is a sectional side view showing a concrete example of a microwave heating apparatus.
Figure 13:
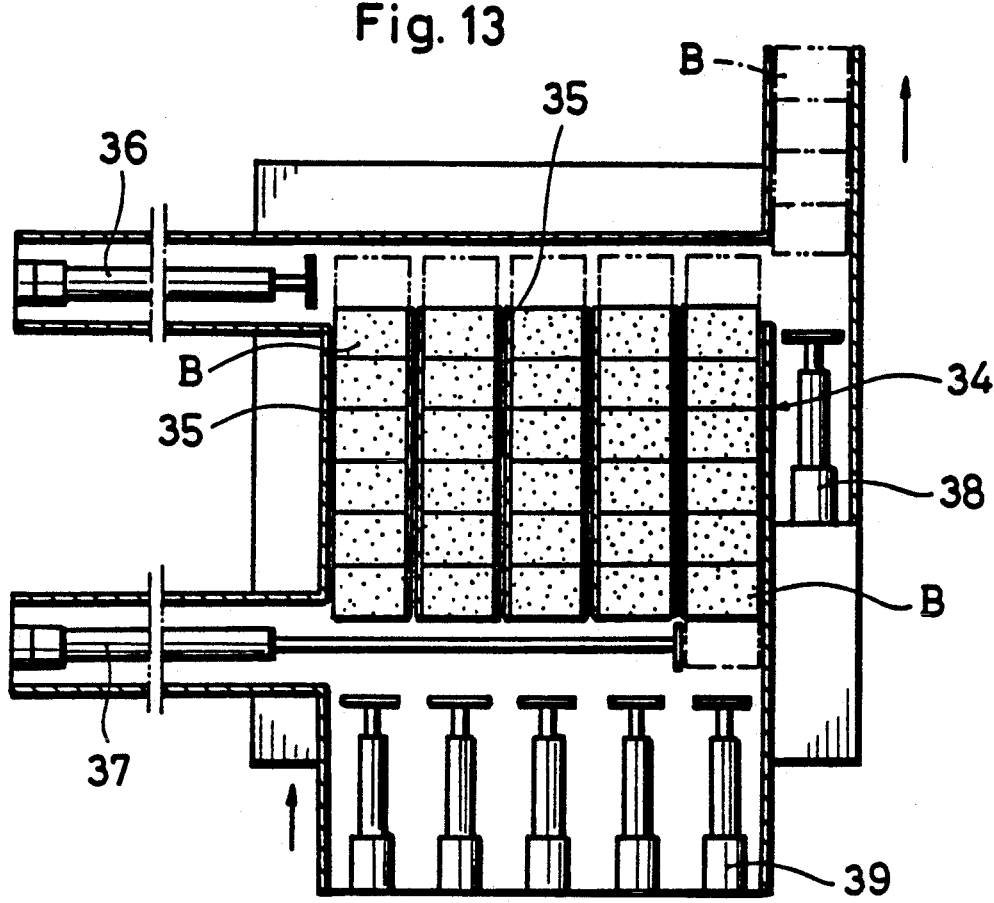
FIG. 13 is a plan view of FIG. 12.

FIG. 12 is a sectional side view showing another example of a microwave heating apparatus and FIG. 13 is a plan view thereof. There are provided quartz pipe passages 35 in five rows transversely and in two stages vertically, that is, a total of ten rows. On an inlet side there are provided ten (five rows in two stages) loading air cylinders 39, and in inlet portions there are provided preform arranging cylinders 37 in two stages vertically for arranging ten agglomerated preforms B. On an outlet side there are provided lateral discharge cylinders 36 and longitudinal discharge cylinders 38 each in two stages vertically for discharging the preforms successively. Ten agglomerated preforms which have been fed before the inlet portions by the arranging cylinders 37 are inserted, ten as one group, into the quartz pipe passages 35 by means of the loading cylinders 39, in which they are heated under the radiation of microwaves introduced through the waveguides 31. The succeeding preforms are loaded successively by repeating the above operation. The agglomerated preforms B undergoes microwave heating for a predetermined time while they move through the quartz pipe passages, and when a predetermined temperature has been reached, one group of them are discharged together. Then, before the next discharge is performed, they are conveyed in the direction of arrow by a cooperative operation based on time difference of the lateral and longitudinal cylinders 36, 37.

The following is a detailed description about a heating method utilizing high-frequency heating.

Figure 14:
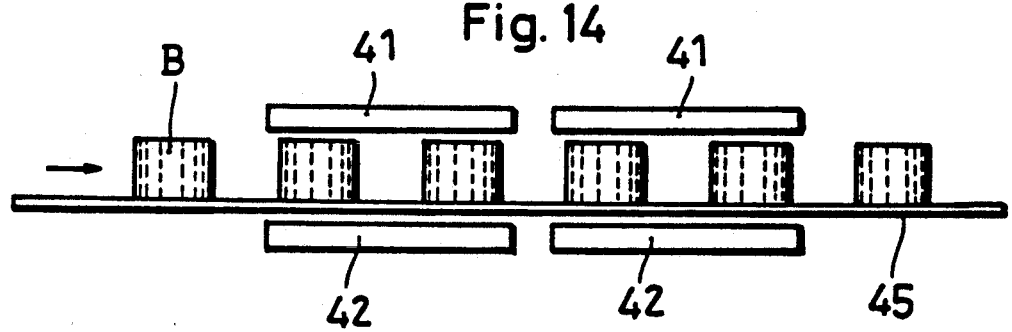
FIGS. 14 and 15 are schematic explanatory views showing examples of high-frequency heating methods.

Referring to FIG. 14, which is an explanatory entire view showing an example of a high-frequency heating apparatus, agglomerated preforms B are carried on a conveyor belt 45 in the direction of arrow, and electrode plates 41 and 42 for the generation of high frequency are disposed in opposed relation on both sides of the preforms. It is recommended that the heating atmosphere be purged with an inert gas such as nitrogen gas to prevent oxidative deterioration of the synthetic resin and other components. In the illustrated example, two pairs of such electrode plates are arranged side by side in the longitudinal direction.

EXAMPLE NO. 3

Silicon carbide was incorporated in a composite material consisting of 70 parts by weight polypropylene powder and 30 parts by weight glass fibers in such a manner that the proportion of the silicon carbide was 1.0 wt %. Using the resulting mixture, a columnar preform of 220 mm dia. by 160 mm long was produced and it was then subjected to the radiation of high frequency of 13 MHz ×3 KW. At this time, the temperature of the preform rose to 260° C. in only 2 minutes, and the temperature difference distribution in the interior of the preform was ±5° C., thus exhibiting excellent uniformity. The heated preform was then molded by means of a compression molding machine. The mechanical strength of the final product was higher than that of a molded article obtained by using a comparative product which had been subjected to kneading and heating.

EXAMPLE NO. 4

In place of the silicon carbide used in Example No. 3, the proportion of carbon black was incorporated in the composite material. Using the resulting mixture, a columnar preform of 220 mm dia. by 160 mm (weight: 2.25 kg) was produced and it was then subjected to a high-frequency heating at 13 MHz ×6 KW. As a result, the temperature of the preform rose to 220° C. in 3 minutes and 30 seconds. At this time, the temperature difference distribution in the interior of the preform was ±5° C.

Figure 16:
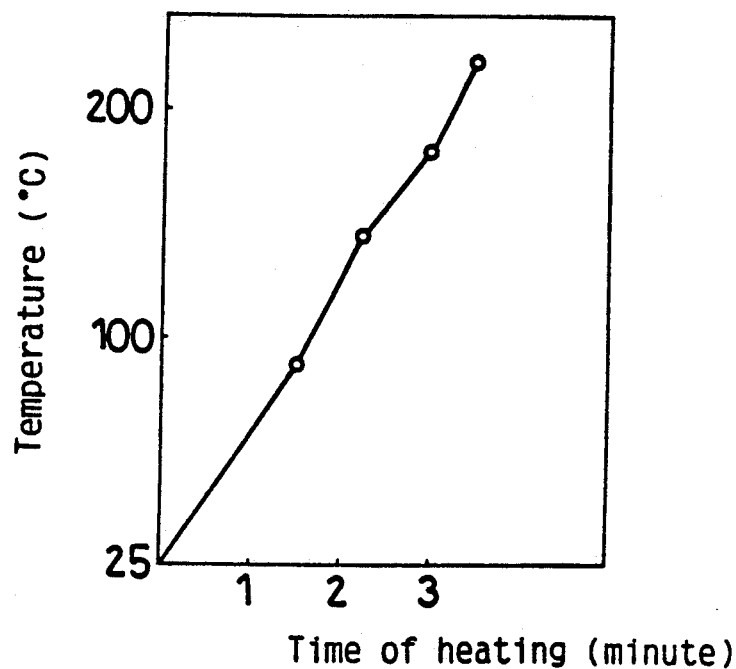
FIG. 16 is a graph showing a relation between heating time and reached temperatures in high-frequency heating.

In this high-frequency heating there was determined a relation between the heating time (unit: minute) and the temperature of the central portion of the agglomerated preform. There were obtained such results as shown in FIG. 16. As can be seen from this graph, there exists a proportional relationship between the heating time and the central portion temperature, and the heating method of the present invention is very stable and superior in controllability.

EXAMPLE NO. 5

Figure 15:
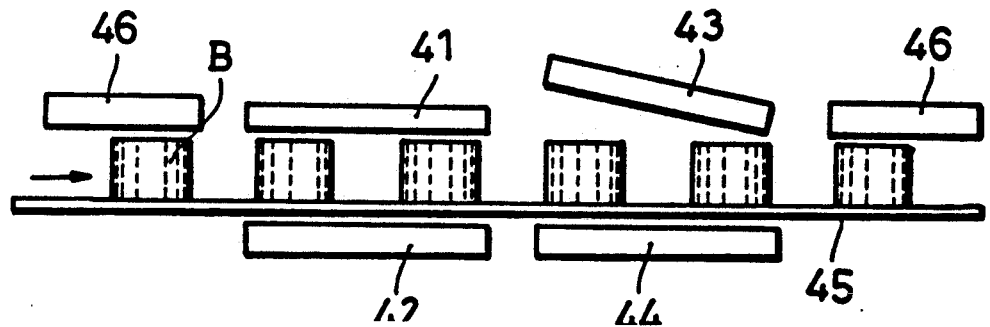

FIG. 15 is an explanatory view showing another working concept of the high-frequency heating method. Carbon black was incorporated in a composite material consisting of 65 parts by weight polypropylene and 35 parts by weight glass fibers so that the proportion of the carbon black was 1.0 wt %. Using the resulting mixture, a columnar preform of 320 mm dia. by 210 mm long was produced. The preform was allowed to travel from left to right on a conveyor belt 45 in FIG. 15 and subjected to a high-frequency heating (13 MHz ×3 KW) using an infrared heater 46 and then a high frequency generator (between electrode plates 41 and 42), then further subjected to a high-frequency heating using another high frequency generator (between electrode plates 43 and 44) with an upper electrode plate 43 being inclined to enhance the heating efficiency gradually. Lastly, heating was again performed from above using an infrared heater 46. The preform was heated to 220° C. in 3 minutes and the temperature difference distribution in the interior of the preform was ±3° C. Although in the illustrated electrode plates 43 and 44 only the upper one is inclined, the lower electrode plate 44 may also be inclined in the same manner. By changing the impedance of the passing preform it is made possible to make a more delicate heating control. Even if there is adopted a method wherein each preform is passed through a quartz pipe or the like, there will be exerted no bad influence on the high frequency heating.

Figure 17:
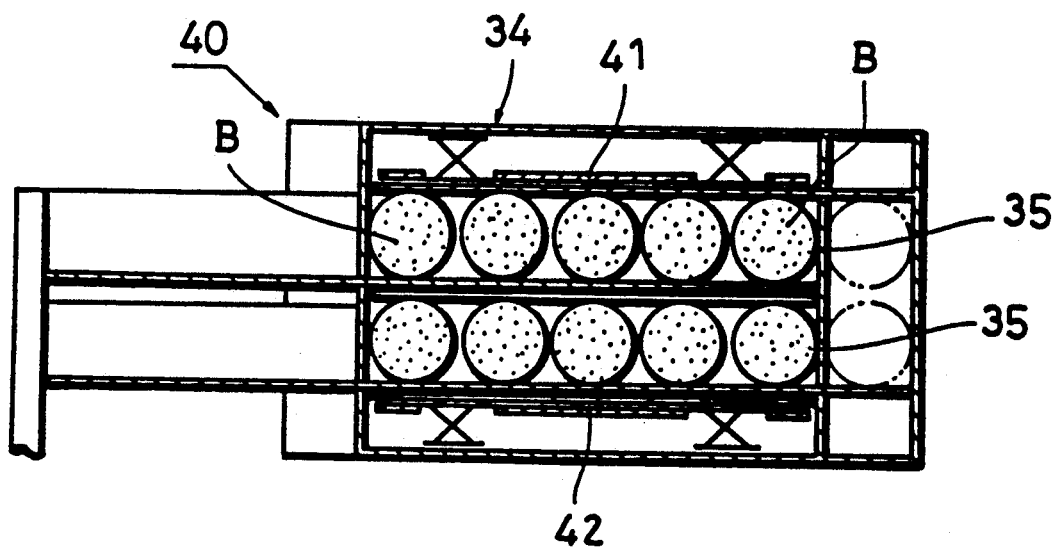
FIG. 17 is a sectional side view showing a concrete example of a high-frequency heating apparatus.

FIG. 17 illustrates a high-frequency heating apparatus 40 corresponding to the apparatus shown in FIG. 12, whereby preforms B arranged in five rows, two stages, are heated successively. Electrode plates 41 and 42 are arranged above and below quartz pipe passages 35 so as to wholly cover the quartz pipe passages 35. The preforms are heated in the quartz pipe passages 35 for a predetermined time and then taken out successively.

In connection with the heating apparatus 1 shown in FIGS. 1, 4 and 5, there may be adopted a method wherein the preform B is heated from the interior thereof without using the gas nozzles 5. In this case, as the preform B there is used one having such holes $B_2$ as shown in FIG. 8, or with such holes $B_2$ being closed at one ends. These holes are formed by inserting heating needles arranged in conformity with the arrangement of the holes into a preform. It is preferable that the temperature of the needles be below the temperature at which the synthetic resin contained in the preform melts and adheres to the needles.

EXAMPLE NO. 6

Nine needles heated to about 140° C. are pierced into an agglomerated preform obtained by using a composite of polypropylene and glass fibers form holes with one ends being closed. The holding time in the pierced state was about 1 minute. If the needle heating temperature is too high, the resin will be deteriorated and adhere to the needles, resulting in that the maintenance of the needles is troublesome and the operability is deteriorated. Therefore, it is desirable that the needle heating temperature be set in a temperature range in which the resin used does not adhere to the needles, taking the melting temperature of the resin into account. The needles may be held at room temperature, at which temperature, however, the holes may be closed by spring back of the glass fibers. It was found better for the needles to be heated to a certain extent for retaining the holes once formed.

Next, the preform now having such holes is loaded into the heating apparatus shown in FIG. 4, and nitrogen gas held at 240° C. is blown directly (without using gas nozzles) into the holes of the preform for about 2 minutes. The heated nitrogen gas thus entered the holes is dispersed to the interior of the preform and thereafter discharged from the upper portion, whereby the preform is heated to about 200°-220° C. from the interior.

This method is advantageous in that the heating can be done uniformly in a short time, and that since gas nozzles 5 or rod-like heaters 22 are not used there occurs neither adhesion nor clogging of molten resin, and handling is easy.

INDUSTRIAL UTILIZABILITY

According to the molding method of the present invention, since it constructed as above, an agglomerated preform containing a synthetic resin and a reinforcing fiber can be heated efficiently in a uniform temperature distribution throughout the whole thereof.

Further, by selecting form or components of the preform suitable for the heating method used it is made possible to raise the temperature of the preform uniformly and efficiently in a short time according to the said heating method.

As a result, in the next molding process it is possible to produce a fiber-reinforced composite product of homogeneous properties and high quality.

What is claimed is:

1. A method for molding a fiber-reinforced composite material comprising a synthetic resin material and reinforcing fibers dispersed therein, wherein the method comprises the steps of forming said composite material into an agglomerated preform, preheating said preform from the interior thereof, and molding the preheated preform into a desired shape, wherein said preheating step is performed by a heating means selected from the group consisting of one or more gas nozzles which are inserted into said preform and through which a high temperature gas is blown to heat said preform, one or more rod-shaped heaters which are inserted into said preform, and one or more holes having one closed end formed in said preform into which a high temperature gas is blown to heat said preform.

2. The method according to claim 1, wherein said heating means comprises one or more gas nozzles which are inserted into said preform, through which a high temperature gas is blown to heat said preform.

3. The method according to claim 2, wherein each of said gas nozzles comprises a sharp tip portion and a body portion having one or more gas ejection holes, through which said high temperature gas is ejected.

4. The method according to claim 1, wherein said heating means comprises one or more rod-shaped heaters which are inserted into said preform.

5. The method according to claim 1, wherein said heating means comprises one or more holes formed in said preform, each having one closed end, into which a high temperature gas is blown to heat said preform.

6. The method according to claim 5, wherein said one or more holes are formed by inserting one or more heated needles into said preform, said heated needles having been heated to a temperature below a temperature at which the synthetic resin material melts and adheres to the needles.

* * * * *